United States Patent [19]
Dennison, Jr.

[11] Patent Number: 5,507,502
[45] Date of Patent: Apr. 16, 1996

[54] PACKING LIFE EXTENDER RING

[75] Inventor: Edward W. Dennison, Jr., Vicksburg, Mich.

[73] Assignee: Kalplas, Inc., Vicksburg, Mich.

[21] Appl. No.: 350,958

[22] Filed: Dec. 7, 1994

[51] Int. Cl.$^6$ .................................................. F16J 15/20
[52] U.S. Cl. ...................... 277/117; 277/190; 277/222; 277/DIG. 6
[58] Field of Search ................................ 277/1, 117–122, 277/190, 191, 222, DIG. 6

[56] References Cited

U.S. PATENT DOCUMENTS

| 3,588,125 | 6/1971 | Mastromatteo | 277/222 |
| 4,230,325 | 10/1980 | Butler et al. | 277/117 |
| 4,489,916 | 12/1984 | Stevens | 277/117 |
| 4,558,874 | 12/1985 | Williams et al. | 277/121 |
| 4,849,379 | 6/1989 | Thoman, Jr. | 277/222 |
| 5,087,057 | 2/1992 | Kurkowski | 277/222 |
| 5,272,198 | 12/1993 | Kaminski et al. | |
| 5,346,939 | 9/1994 | Moren et al. | |

FOREIGN PATENT DOCUMENTS 1190937  5/1970  United Kingdom .

*Primary Examiner*—Scott W. Cummings
*Attorney, Agent, or Firm*—Flynn, Thiel, Boutell & Tanis

[57] ABSTRACT

A packing life extender ring assembly which includes a first annular ring and a second annular ring concentrically encircling the first ring, both rings having tapered surfaces matingly engaging one another. The first and second rings are both made of a composition containing 60% to 85% by weight virgin polytetrafluoruethylene, the remainder being calcium metasilicate.

3 Claims, 1 Drawing Sheet

PACKING LIFE EXTENDER RING

FIELD OF THE INVENTION

This invention relates to a packing life extender ring assembly and, more particularly, to an assembly having a pair of annular rings, each with a tapered surface thereon matingly engaging the other, which rings are made of a composition consisting of virgin polytetrafluoruethylene and calcium metasilicate.

BACKGROUND OF THE INVENTION

Slurries, abrasives, dry product and many chemicals can be hard on shaft packing. Even with sufficient flush back pressure, dimensional wear and shaft runout can render packing all but useless in a matter of weeks, or even days. At this point, the only solution has heretofore been to shut down the associated system and repack the stuffing box.

Accordingly, it is an object of this invention to provide, in a stuffing box environment, a packing life extender ring assembly which includes a pair of annular rings each having a tapered surface thereon matingly engaging the other, the rings being made of a composition containing virgin polytetrafluoruethylene and calcium metasilicate.

It is a further object of the invention to provide a packing life extender ring assembly, as aforesaid, wherein the composition includes 60% to 85% by weight virgin polytetrafluoruethylene, the remainder being calcium metasilicate. The preferable composition is 75% by weight polytetrafluoruethylene, the remainder being 25% by weight calcium metasilicate. This composition includes materials that are suitable for use in the food processing industry and the pharmaceutical industry as well as other industries.

SUMMARY OF THE INVENTION

The objects and purposes of this invention have been met by providing a packing life extender ring assembly which includes a first annular ring and a second annular ring concentrically encircling the first ring, both rings having tapered surfaces matingly engaging one another. In a first embodiment, the first and second rings are both made of a composition containing 60% to 85% by weight virgin polytetrafluoruethylene, the remainder being calcium metasilicate.

BRIEF DESCRIPTION OF THE DRAWINGS

Other objects and purposes of this invention will be apparent upon a reading of the following specification and an inspection of the accompanying drawings, in which.

DETAILED DESCRIPTION

Figure 1:
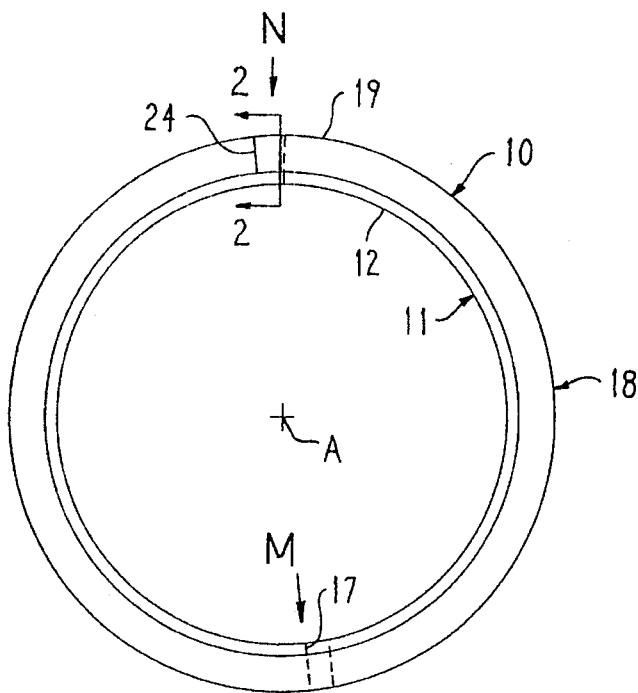
FIG. 1 is an axially facing view of a packing life extender ring assembly embodying the invention.
Figure 2:
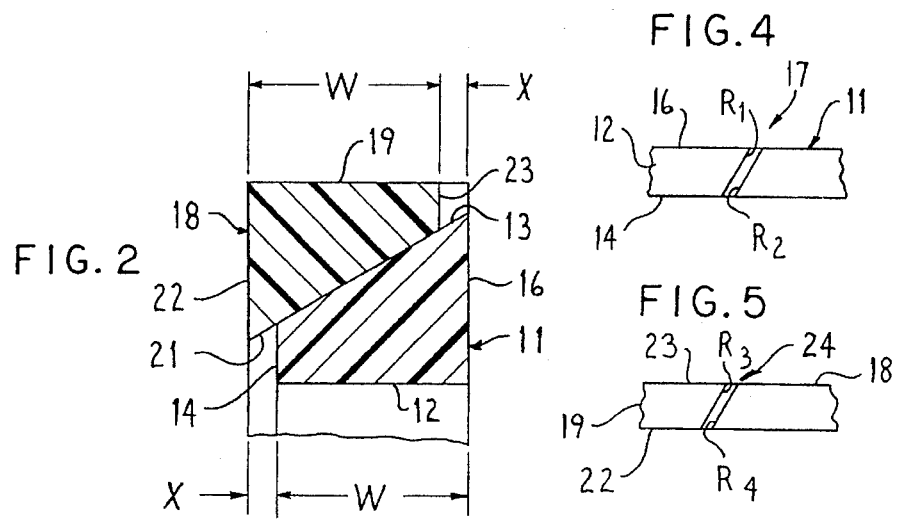
FIG. 2 is a sectional view taken along the line 2—2 of FIG. 1.
Figure 4:
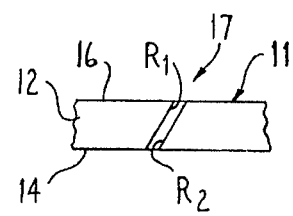
FIG. 4 is a view of the inner ring in direction of the arrow M in FIG. 1 and with the surfaces $R_1$ and $R_2$ separated.
Figure 5:
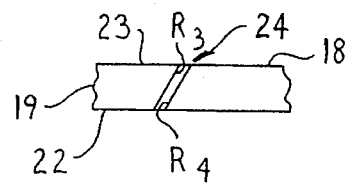
FIG. 5 is a view of the outer ring in direction of the arrow N in FIG. 1 and with the surfaces $R_3$ and $R_4$ separated.

A packing life extender ring assembly 10, also known as a wedge ring assembly, embodying the invention is illustrated in FIG. 1. The packing life extender ring 10 includes a first inner ring 11 having a cylindrical, radially inwardly, facing surface 12 concentrically oriented about a central axis A. The inner ring 11 also includes a conically tapered, radially outwardly, facing surface 13 also concentrically oriented about the central axis A. The inner annular ring 11 further includes a pair of axially spaced and axially facing surfaces 14 and 16, each oriented in planes that are perpendicular to the central axis A and bound the radially inwardly facing surface 12 and the radially outwardly facing surface 13. A cut 17 is provided through the material of the inner ring 17 so as to create a pair of mating mirror image surfaces $R_1$ and $R_2$ extending between the pair of axially spaced and axially facing surfaces 14 and 16, these surfaces each being oriented in a plane containing a diameter of the inner ring 11 and extending at an angle to the pair of axially spaced and axially facing surfaces 14 and 16 that is in the range of 25° to 45°. The preferable angle is 35°.

The packing life extender ring assembly 10 also includes a second annular outer ring 18 concentrically encircling the inner ring 11. The outer ring 18 includes a cylindrical, radially outwardly, facing surface 19 concentrically oriented about the central axis A. A conically tapered, radially inwardly, facing surface 21 is also concentrically oriented about the central axis A and is in a sliding, matingly engaging relation with the tapered, radially outwardly, facing surface 13 of the inner ring 11. The outer ring also includes a pair of axially spaced and axially facing surfaces 22 and 23 each oriented in planes that are perpendicular to the aforesaid central axis A and bound the radially inwardly and outwardly facing surfaces on the outer ring 18. In addition, the pair of axially spaced and axially facing surfaces 14 and 16 on the inner ring 11 are axially offset from the pair of axially spaced and axially facing surfaces 22 and 23 on the outer ring 18 in a common direction. In this particular embodiment, the axial width W of both the inner ring 11 and the outer ring 18 are identical. The outer ring 18 also includes a cut 24 which creates a pair of mating mirror image surfaces $R_3$ and $R_4$ each being oriented in a plane containing a diameter of the outer ring 18 and extend at an angle to the pair of axially spaced and axially facing surfaces 22 and 23 that is in the range of 25° to 45°. The preferable angle is 35° so that a mating and sealing engagement will occur between the tapered surfaces 13 and 21.

The inner and outer rings 11 and 18 are both made of a composition containing in the range of 60% to 85% by weight virgin polytetrafluoruethylene and 15% to 30% by weight calcium metasilicate. The preferable composition is 75% by weight polytetrafluoruethylene, the remainder being 25% by weight calcium metasilicate.

Figure 3:
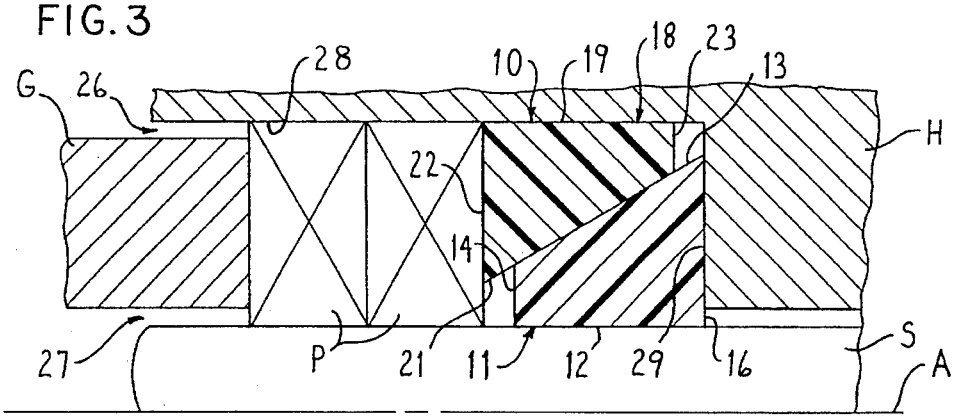
FIG. 3 is a longitudinal sectional view of a conventional stuffing box having the inventive packing life extender ring assembly located therein.

The aforesaid ring assembly 10 is adapted to be incorporated into a housing H, such as a pump housing having a hole 26 therein and out of which extends a shaft S rotatably supported about an axis of rotation A. The opening 26 is larger in diameter than the diameter of the shaft S so that a radial spacing 27 exist between an outer surface of the cylindrical shaft S and a radially inwardly facing cylindrical surface 28 on the housing H. The annular spacing terminates at one end in a wall 29 oriented in a plane that is generally perpendicular to the axis of rotation A. The packing life extender ring assembly 10 is inserted into the radial spacing 27 so that the axially facing surface 16 abuts the wall 29 on the housing H. The radially inwardly facing surface 12 on the inner ring 11 slides onto the shaft S whereas the radially outwardly facing surface 19 on the outer ring 18 slidingly engages the surface 28 of the opening 26 as the assembly is moved into the annular spacing 27. Since the pair of rings 11 and 18 are offset from one another by the dimension X, any force applied to the outer ring 18 would have a tendency to expand the diameter of the outer ring 18 and open the cut 24 to define a gap. However, expansion of the outer ring 18 is confined or restricted by the carefully selected dimension of the cylindrical surface 28 relative to the exterior surface of the shaft S. Any axial force applied to the outer ring 18 in a rightward direction (FIG. 3) would have a tendency to compress the inner ring 11 as well as compressing and sealing the mating surfaces formed by the cut 17. The cut 24 will remain closed and sealed by reason of the aforesaid carefully selected dimension of the cylindrical surface 28 formed on the housing H relative to the exterior surface of the shaft S.

Conventional packing P is placed into the annular space 27 and against the axially facing surface 22 of the outer ring 18. An adjustable gland G is provided for compressing the packing P between the outer ring 18 and the gland G and into sealing engagement with the surface 28 and the outer surface of the shaft S. Such an adjustable gland is illustrated in U.S. Pat. No. 863,619 and reference thereto is to be incorporated herein. Compression brought about by the gland G will also cause a seal to be formed between the surface 19 of the ring 18 and the interior wall 28 of the housing H and between the surface 12 of the ring 11 and the exterior surface of the shafts and between the surface 16 of the ring 11 and the interior wall 29 of the housing H. A seal also will exist between the inclined and matingly engaged surfaces 13 and 21 on the rings. Even as shaft runout occurs due to wear, the aforementioned sealed locations will remain effective to prevent liquid from leaking past the packing life extender rings unto the packing P.

The utilization of the composition described above has resulted in a very surprising result. As stated in the Background of the Invention above, frequent changes of the seal inside of a stuffing box was prevalent in instances where slurries, abrasives, dry product and other chemicals are utilized in association with a shaft packing. More specifically, the surprising result is 10 that a utilization of a packing life extender ring assembly made of the composition results in a very enhanced lifetime of the seal without necessitating a repacking of the stuffing box. One instance of experimental use in a water treatment plant resulted in a continued operation of the seal for in excess of one year without having to repack the stuffing box.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A packing life extender ring assembly, comprising:

a first annular ring having a central axis, a cylindrical radially inwardly facing surface concentrically oriented about said central axis, a conically tapered radially outwardly facing surface conically oriented about said central axis, a first pair of axially spaced and axially facing surfaces each oriented in planes that are perpendicular to said central axis and bound said radially inwardly facing surface and said radially outwardly facing surface, and means defining a first pair of mating mirror image surfaces extending between said first pair of axially spaced and axially facing surfaces and said radially inwardly and radially outwardly facing surfaces, said first pair of mating mirror image surfaces each being oriented in a plane containing a diameter of said first ring and extending at an angle to said first pair of axially spaced and axially facing surfaces that is in the range of 25° to 45°;

a second annular ring concentrically encircling said first ring, said second ring having a cylindrical radially outwardly facing surface concentrically oriented about said central axis, a conically tapered radially inwardly facing surface conically oriented about said central axis and matingly engaging said tapered radially outwardly facing surface on said second annular ring, a second pair of axially spaced and axially facing surfaces each oriented in planes that are perpendicular to said central axis and bound said radially inwardly and outwardly facing surfaces on said second annular ring and being axially offset from said first pair of axially spaced and axially facing surfaces in a common direction, and a second pair of mating mirror image surfaces extending between said second pair of axially spaced and axially facing surfaces and said radially inwardly and said radially outwardly facing surfaces, said second pair of mating mirror image surfaces each being oriented in a plane containing a diameter of said second ring and extending at an angle to said second pair of axially spaced and axially facing surfaces that is in the range of 25° to 45°; and said first and second rings being both a composition containing in the range of 60% to 85% by weight virgin polytetrafluoruethylene, the remainder being calcium metasilicate.

2. The packing life extender ring assembly according to claim 1, wherein said composition includes 75% by weight virgin polytetrafluoruethylene and 25% by weight calcium metasilicate.

3. The packing life extender ring assembly according to claim 1, wherein the pair of mating mirror image surfaces on said first and second rings extend at an angle that is 35° to the respective pair of axially spaced and axially facing surfaces.

* * * * *